Jan. 27, 1953 D. A. BOYD 2,626,822
OIL SEAL
Filed June 23, 1945
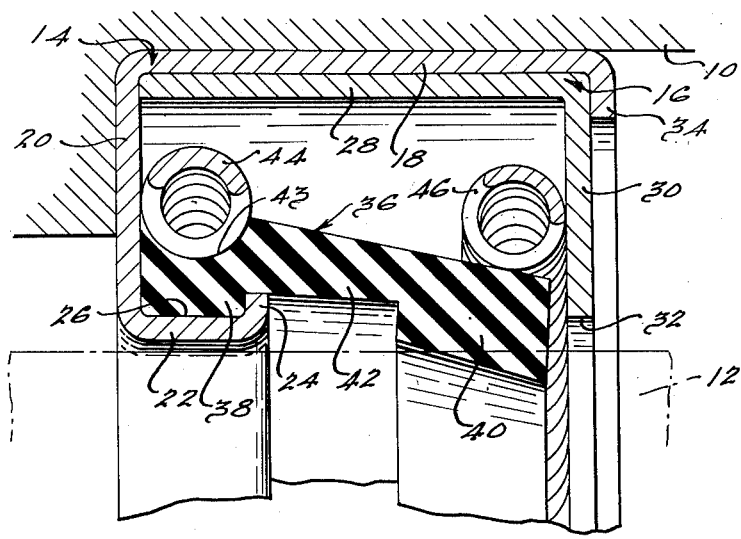
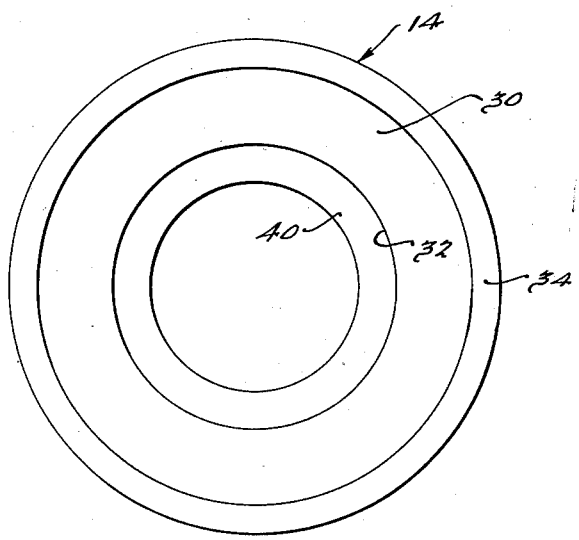
INVENTOR.
Donald A. Boyd.
BY
ATTORNEY.

Patented Jan. 27, 1953

2,626,822

UNITED STATES PATENT OFFICE 2,626,822

OIL SEAL

Donald A. Boyd, Detroit, Mich.

Application June 23, 1945, Serial No. 601,192

2 Claims. (Cl. 288—3)

This invention relates to a seal and more particularly to a unitary oil seal adapted to be inserted within the bore of a housing in encompassing relation to a rotatable or reciprocating shaft.

An object of the invention is to provide novel retaining means for a flexible packing member within a metallic housing.

Another object of the invention is to provide a retaining member for a flexible packing member which is quickly and easily assembled into holding position and one which may be economically manufactured.

Other objects and advantages of the invention will more fully appear from the following description taken in connection with the accompanying drawings in which:

Fig. 1 is a longitudinal sectional view through a housing showing a portion of the improved seal inserted therein in encompassing relation to a shaft; and Fig. 2 is an end view of the seal.

Referring to the drawings, the seal is illustrated as disposed within a housing 10 in encompassing relation with a shaft 12 and includes an annular housing having an outer shell 14 and an inner cup 16.

The outer shell is formed having an outer axially extending flange 18, an integral radially extending flange 20 and a re-entrant flange 22 extending axially from the radially extending flange 20 and spaced inwardly from the flange 18. The inner periphery of the flange 22 forms the annular opening through which the shaft 12 extends. The inner edge of the flange 22 is turned radially outwardly forming a flange 24 which together with the flange 20 provides a channel 26.

The inner cup 16 has an axially extending flange 28 nested within the flange 18. The edge of the flange 28 abuts the flange 20 of the cage 14. The opposite end of the flange 28 is provided with an integral radially extending flange 30 which has a central opening 32 through which extends the shaft 12. The cup is held within the cage 14 by a turned over flange 34 at the edge of the flange 18.

An annular band of flexible packing material 36 has one end portion 38 in the channel 26 and its opposite end portion 40 of slightly less diameter for sealing engagement with the shaft 12. An intermediate portion 42 of thinner section serves as a flexible connection between the end portions to permit radial shifting of the portion 40 for accurate sealing relation with the shaft. The inner periphery of the end portion 40 is slightly conical having a smaller diameter at its outer end for more tightly engaging the shaft.

The end portion 38 of the packing material 36 has its outer periphery formed with an arcuate groove 43 for the reception of a garter spring 44 and its inner periphery projects radially inwardly for reception in the groove 26. Around the outer periphery of the end portion 40 is a garter spring 46 for resiliently urging the end 40 radially inwardly into tight sealing engagement with the shaft 12.

The parts are assembled by forcing the end portion 38 of the packing 36 over the flange 24 into the channel 26. The garter spring 44 is then stretched over the outer periphery of the end portion 38 and positioned in the groove 43. The radial tension of the spring 44 retains the end portion 38 within the channel for positively retaining the packing member 36 in position. The garter spring 46 is then placed over the outer periphery of the end portion 40 and the cup 16 is inserted in the cage 14 with the flange 30 thereof retaining the garter spring 46 in its proper position. The flange 34 is then bent over the outer edge of the flange 30 to retain the parts in assembled position.

The spring 44 is preferably stronger than the spring 46 for exerting more radial force on the packing member.

By the above arrangement of parts the seal is easily assembled and the cost of manufacture has been reduced.

It will be understood that various changes including the size, shape and arrangement of parts may be made without departing from the spirit of my invention and it is not my intention to limit its scope other than by the terms of the appended claims.

I claim:

1. A self contained sealing unit of the type described, comprising a centrally apertured sheet metal housing for pressed fit insertion within a housing about a centrally located shaft, said housing having an outer shell provided with an axially extending flange and an integral radially extending flange, a second integral axially extending flange underlying said first axially extending flange and spaced therefrom, the end portion of said second named axially extending flange being bent radially toward said first named flange to provide a channel opening radially toward said first named axially extending flange, a flexible band of packing material having one end thereof within the channel and its opposite end projecting axially beyond the channel, and a garter spring around the outer periphery of each of said end portions of said packing, a portion of said packing material substantially mid-way between said springs of reduced thickness.

2. A self contained sealing unit of the type described, comprising a centrally apertured sheet metal casing for pressed fit insertion within a housing about a centrally located shaft, said casing having an outer shell provided with an axially extending portion and an integral radially extending flange having an integral axially extending flange underlying said axially extending casing portion and spaced therefrom, the end portion of said axially extending flange being bent radially toward said axially extending casing portion to provide a channel opening radially toward said axially extending casing portion, a flexible band of packing material having one end thereof within the channel and its opposite end projecting axially beyond the channel, and a garter spring around the outer periphery of each of said end portions of said packing, a portion of said packing material substantially midway between said springs being of reduced thickness.

DONALD A. BOYD.

REFERENCES CITED

The following references are of record in the file of this patent:

UNITED STATES PATENTS

| Number    | Name          | Date           |
|-----------|---------------|----------------|
| 1,507,567 | Aschenbach    | Sept. 9, 1924  |
| 1,983,522 | Coultas       | Dec. 11, 1934  |
| 2,162,104 | Mosher        | June 13, 1939  |
| 2,264,970 | Giles         | Dec. 2, 1941   |
| 2,290,593 | Johnson et al.| July 21, 1942  |
| 2,319,067 | Kosatka       | May 11, 1943   |